US005283134A

United States Patent [19]

Sugimoto et al.

[11] Patent Number: 5,283,134
[45] Date of Patent: Feb. 1, 1994

[54] SPARK PLUG INSULATOR AND A METHOD OF SINTERING

[75] Inventors: Makoto Sugimoto; Hiroyuki Tanabe; Mamoru Musasa, all of Nagoya, Japan

[73] Assignee: NGK Spark Plug Co., Ltd., Nagoya, Japan

[21] Appl. No.: 804,786

[22] Filed: Dec. 9, 1991

[51] Int. Cl.[5] .................... B32B 9/00

[52] U.S. Cl. .................... 428/698; 501/98; 313/143; 427/226; 264/65; 264/66

[58] Field of Search .................... 501/96, 97, 98; 428/446, 699, 698; 313/137, 143; 427/226; 264/65, 66

[56] References Cited

U.S. PATENT DOCUMENTS

| | | | |
|---|---|---|---|
| 4,731,303 | 3/1988 | Hirano et al. | 428/700 |
| 4,970,095 | 11/1990 | Bolt et al. | 427/226 |
| 4,971,779 | 11/1990 | Paine, Jr. et al. | 423/290 |
| 5,004,708 | 4/1991 | Moore | 501/96 |
| 5,030,598 | 7/1991 | Hsieh | 501/98 |
| 5,057,465 | 10/1991 | Sakamoto et al. | 501/90 |
| 5,082,710 | 1/1992 | Wright | 428/76 |

OTHER PUBLICATIONS

"Preparational and Properties of Thin Film Boron Nitride" M. Rand cfd. J. Electrochem Soc. Apr. 1968.

Murray et al "Growth of Stoichiometric BN Films by Pulsed Laser Evaporation" MRS. Symp Proc vol. 128 1989.

*Primary Examiner*—Mark L. Bell
*Assistant Examiner*—Wright Alan
*Attorney, Agent, or Firm*—Cooper & Dunham

[57] ABSTRACT

A spark plug insulator is desirably made up of a sintered body of AlN-based ceramic powder comprising about 60–98% AlN and a sintering additive. There is provided on the surface of the sintered body a layer of pyrolytic boron nitride having a thickness in the range 10–100 μm.

3 Claims, 2 Drawing Sheets

SPARK PLUG INSULATOR AND A METHOD OF SINTERING

BACKGROUND OF THE INVENTION

1. Field of the Invention

This invention relates to a spark plug insulator and a method of sintering the same for use in an internal combustion engine.

2. Description of Prior Art

In a spark plug insulator for an internal combustion engine, a nitride-based sintered ceramic body has been employed since the sintered ceramic body has good thermal conductivity while maintaining good electrical insulation.

Taking Japanese Patent Publication No. 46634/1980 as one example of this type of insulator, an oxide of element selected from IIIA group of periodic table, silicate-based compounds and metallic oxides are sintered with aluminum nitride powder as a main component.

The insulator thus sintered, however, decreases its electrical insulation (less than 5 MΩ) when exposed to high ambient temperature so as to occur electrical leakage, and thus leading to misfire when high voltage is applied across a center electrode and an outer electrode.

Therefore, it is an object of the invention to provide a spark plug insulator which is capable of maintaining an elevated insulation property at high ambient temperature with good thermal conductivity, thus preventing electrical leakage to protect against misfire, and contributing to an extended service life.

SUMMARY OF THE INVENTION

According to the invention, there is provided a spark plug insulator comprising a sintered body including an aluminum nitride ceramic powder having a weight ranging from 60% to 98% of the weight of the sintered body and a sintering additive; and a pyrolytic boron nitride layer uniformly provided on an entire surface of the sintered body, a thickness of the pyrolytic boron nitride layer ranging from 10 μm to 100 μm.

The aluminum nitride ceramic powder is densely sintered by adding the sintering additive. The nitride-based ceramic powder of less than 60% of the weight of the sintered body deteriorates its thermal conductivity so as to reduce heat-dissipating property.

Meanwhile, the aluminum nitride ceramic powder exceeding 98% of the weight of the sintered body is not normally sintered.

On the entire surface of the sintered body, is the pyrolytic boron nitride layer deposited which has high electrical insulation property ($10^5 \sim 1.5 \times 10^5$/mm MΩ at 700° C.) with good thermal conductivity (80 W/ m.k at 700° C.) maintained. This makes it possible to prevent electrical insulation of the insulator surface from decreasing, and thus protecting the insulator against electrical leakage so as to prevent misfire when high voltage is applied across a center electrode and an outer electrode.

The pyrolytic boron nitride layer of less than 10 μm in thickness makes it difficult to fully cover a minute unevenness surface of the sintered body, thus making useless in improving its electrical insulation.

While, the pyrolytic boron nitride layer exceeding 100 μm in thickness tends to exfoliate from the surface of the sintered body owing to difference of thermal expansion between the layer and the sintered body.

With the thickness of the pyrolytic boron nitride layer ranging from 10 μm to 100 μm, the layer fully covers the entire surface of the sintered body while maintaining good electrical insulation and not exfoliated with minimum amount of the pyrolytic boron nitride.

These and other objects and advantages of the invention will be apparent upon reference to the following specification, attendant claims and drawings.

DETAILED DESCRIPTION OF THE EMBODIMENTS

Figure 1:
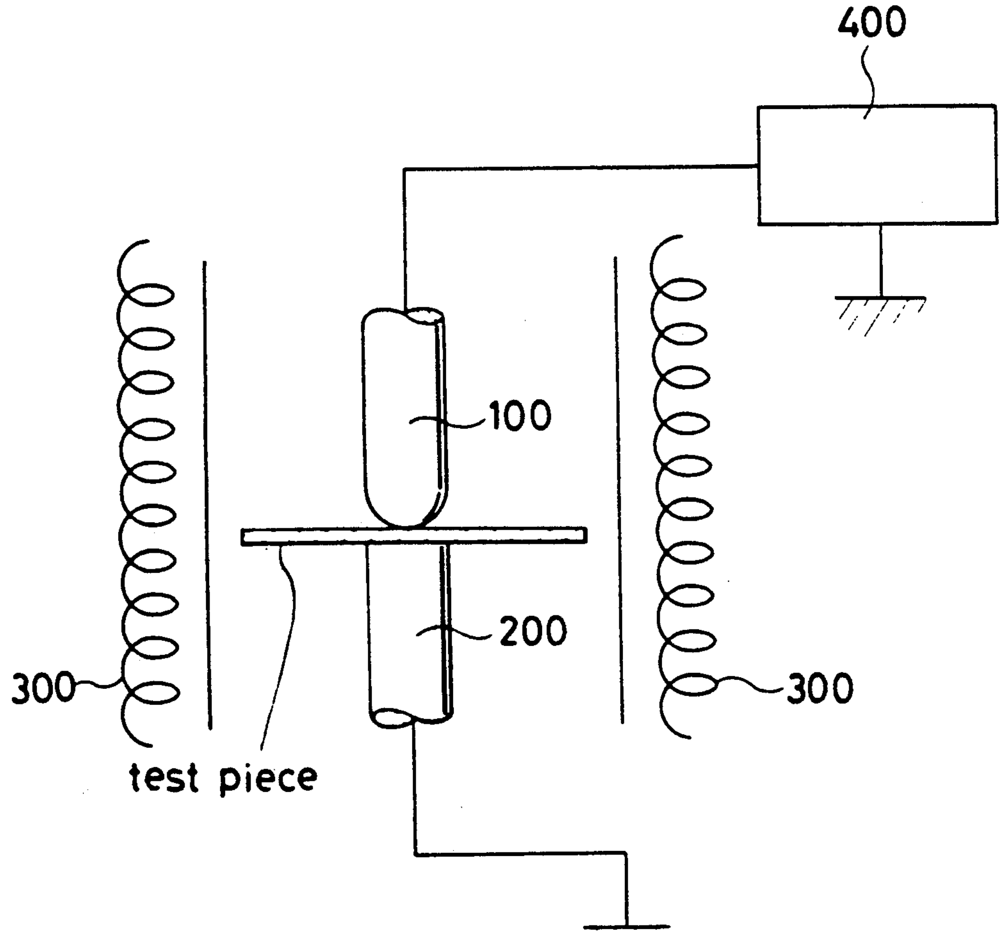
FIG. 1 is a schematic plan view showing a device to measure insulation resistance of test pieces at high temperature.

Aluminum nitride (AlN) powder is prepared as a nitride-based ceramic powder according to the weight percentage listed in Table 1. Granular size of the aluminum nitride (AlN) powder measures 1.5 μm in average diameter (sedimentation analysis) with a weight context of oxygen equal rate as 0.8 weight percent.

Sintering additives employed herein are all 99.9% purity selected alone or in combination from the group consisting of yttrium oxide ($Y_2O_3$), calcium oxide (CaO), barium oxide (BaO), calcium carbide ($CaC_2$), scandium oxide ($Sc_2O_3$) and neodymium oxide ($Nd_2O_3$). These sintering additives are added to the aluminum nitride (AlN) powder according to the weight percentage also listed in Table 1.

Among test pieces prepared for a spark plug insulator, the test pieces (Nos. 1～22) are manufactured as follows:

(1) A slurry mixture of the aluminum nitride powder, the sintering additive (sintering additives) and ethanol, wax-related binder are kneaded by means of a ball for 15 hours within a nylon pot. In this instance, a quantity of the sintering additive (sintering additives) is determined by taking the fact into consideration that the sintering additive disappears during a sintering process described hereinafter.

(2) The slurry mixture is desiccated by means of a spray dryer. Then the mixture is pressed by a metallic die at the pressure of 1 ton/$cm^2$, and is formed into a compact plate which measures 50 mm in diameter and 1.5 mm in thickness.

(3) The compact plate is degreased by primarily sintering (calcination) it in an atmospheric environment at the temperature of 500°～600° C. for 5 hours. A rate of the temperature rise is adapted to be 300° C. per hour.

(4) Under the normal pressure, the compact plate is secondarily sintered at temperature of 1650°～1950° C. in nitrogen atmosphere for about 2 hours to form a sintered body.

(5) The sintered body is placed in a carbon furnace in which boron chloride ($BCl_3$) and ammonia gas ($NH_3$) chemically react at the temperature of about 1900° C. under $10^{-2} \sim 10^{-3}$ Torr to form a pyrolytic boron nitride (referred to as PBN hereinafter). In the carbon furnace, the pyrolytic boron nitride is simultaneously deposited on an entire surface of the sintered body to provide a pyrolytic boron nitride layer, a thickness of which ranges from 10 μm to 100 μm inclusive.

In this instance, the thickness of the PBN layer is controlled by the ours in which the boron chloride ($BCl_3$) and the ammonia gas ($NH_3$) react in the carbon furnace since it is known that the pyrolytic boron nitride deposits on the entire surface of the sintered body at the rate of 20~30 μm per hour. Upon measuring the thickness of the PBN layer, the test pieces are sectioned and checked at their sectional area by means of an electronic microscope. And the layer of boron nitride was investigated by X-ray diffraction. As result of X-ray diffraction analysis, it is found that the PBN layer is substantially of hexagonal boron nitride. The hexagonal boron nitride is suitable to the spark plug insulator since the hexagonal boron has an inherent property of high hardness, high heat conductivity and high electrical insulation.

The sintered body, thus conditioned, measures 40 mm in diameter and 1.0 mm in thickness.

TABLE 1

| test piece No. | AlN wt % | sintering additive | wt % | thickness of PBN layer (μm) |
|---|---|---|---|---|
| 1 | 60 | $Y_2O_3$ | 40 | 60 |
| 2 | 85 | $Y_2O_3$ | 15 | 90 |
| 3 | 96 | $Y_2O_3$ | 4 | 90 |
| 4 | 94 | CaO | 6 | 55 |
| 5 | 60 | SrO | 20 | 30 |
| | | $Y_2O_3$ | 20 | |
| 6 | 70 | BaO | 20 | 10 |
| | | CaO | 10 | |
| 7 | 85 | $CaC_2$ | 10 | 85 |
| | | $Y_2O_3$ | 5 | |
| 8 | 95 | $Nd_2O_3$ | 5 | 45 |
| 9 | 95 | $Sc_2O_3$ | 5 | 20 |
| 10 | 95 | $Y_2O_3$ | 5 | 11 |
| 11 | 70 | $Y_2O_3$ | 30 | 140 |
| 12 | 90 | $Y_2O_3$ | 10 | 125 |
| 13 | 98 | $CaF_2$ | 2 | 8 |
| 14 | 80 | SrO | 10 | 9 |
| | | $Y_2O_3$ | 10 | |
| 15 | 90 | $La_2O_3$ | 10 | 105 |
| 16 | 95 | CaO | 5 | 2 |
| 17 | 95 | $CaF_2$ | 5 | 5 |
| 18 | 50 | SrO | 10 | — |
| | | $Y_2O_3$ | 40 | |
| 19 | 55 | CaO | 10 | — |
| | | $Y_2O_3$ | 35 | |
| 20 | 97 | $Y_2O_3$ | 3 | 0.5 |
| 21 | 96 | CaO | 4 | 2 |
| 22 | 96 | $Y_2O_3$ | 2 | 1.5 |
| | | $CaF_2$ | 2 | |

Among the test piece Nos. 1~22 listed in Table 1, Nos. 1~10 concerns to the subject invention, while Nos. 11~17 concerns to counterpart insulators in which each thickness of PBN layer departs from the range of 100 μm to 100 μm. Nos. 18~22 concerns to counterpart insulators in which PBN layer is not provided on a surface of the sintered body.

A device shown in FIG. 1 is used to measure insulation resistance of the test piece Nos. 1~22 at the temperature of 700° C. The device has brass-made electrodes 100, 200, a heater 300 and a 500-volt digital resistance meter 400.

Figure 2:
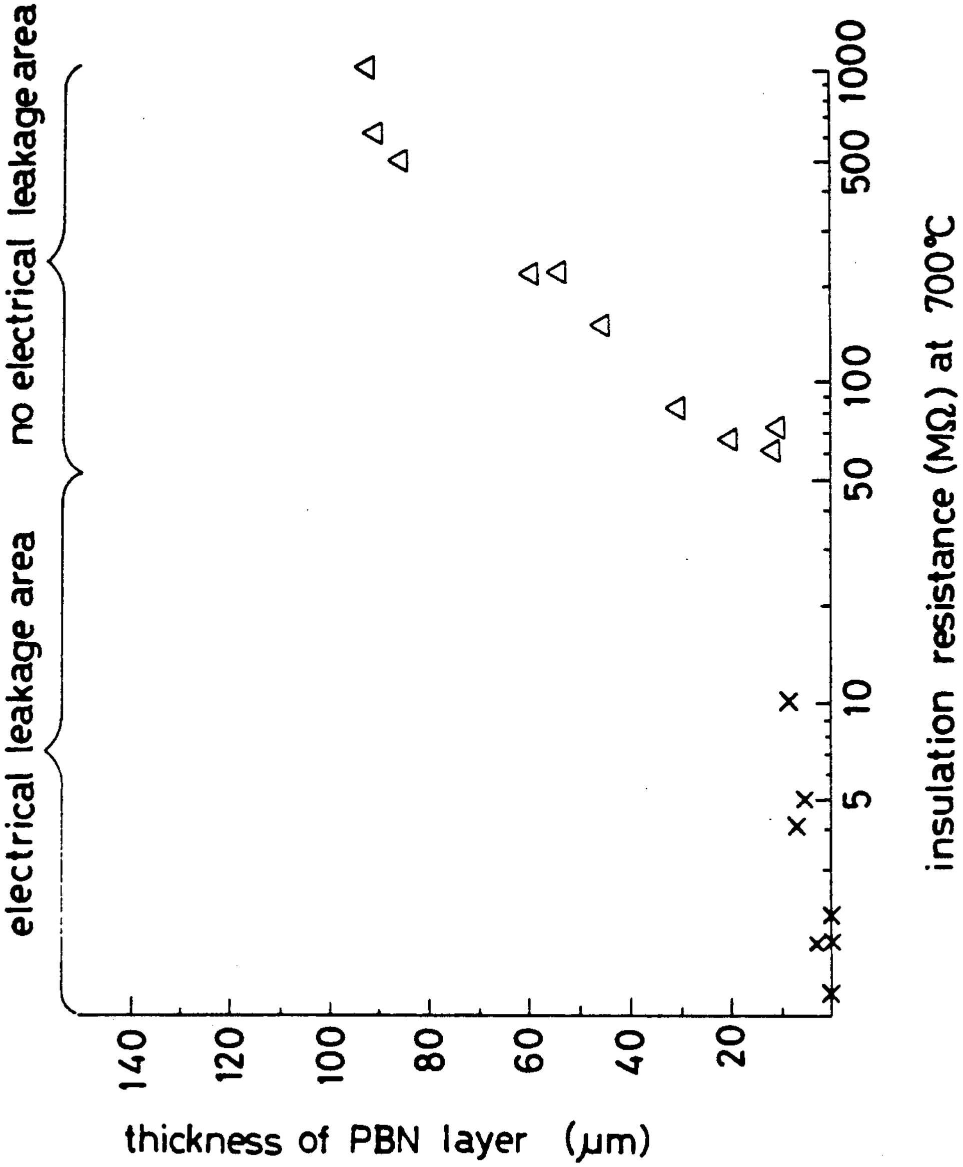
FIG. 2 is a graph showing how insulation resistance of an insulator changes depending on thickness dimension of pyrolytic boron nitride layer.

The measurement result of the test piece Nos. 1~22 is shown in Table 2 in which insulation resistance of more than 50 MΩ at 700° C. is found substantially immune to misfire caused from electrical leakage when high voltage is applied across a center electrode and an outer electrode of a spark plug as shown in FIG. 2. FIG. 2 indicates that the insulation resistance of more than 50 MΩ at 700° C. is presented when the thickness of the PBN layer ranges from 10 μm to 100 μm as designated by delta legends (Δ), while the insulation resistance of less than 50 appears when the thickness of the PBN layer is less than 10 μm as indicated by crisscrosses (×).

TABLE 2

| test piece No. | thermal conductivity (W/m · k) | thickness of PBN layer (μm) | insulation resistance (MΩ) |
|---|---|---|---|
| 1 | 40 | 60 | 200 |
| 2 | 80 | 90 | 600 |
| 3 | 140 | 90 | 1000 |
| 4 | 120 | 55 | 200 |
| 5 | 35 | 30 | 80 |
| 6 | 60 | 10 | 70 |
| 7 | 90 | 85 | 500 |
| 8 | 135 | 45 | 150 |
| 9 | 105 | 20 | 65 |
| 10 | 180 | 11 | 60 |
| 11 | 55 | 140* | — |
| 12 | 110 | 125* | — |
| 13 | 160 | 8 | 4 |
| 14 | 78 | 9 | 10 |
| 15 | 105 | 105* | — |
| 16 | 135 | 2 | 2 |
| 17 | 105 | 5 | 5 |
| 18 | 20 | no layer provided | — |
| 19 | 25 | no layer provided | — |
| 20 | 115 | no layer provided | 0.5 |
| 21 | 160 | no layer provided | 2 |
| 22 | 135 | no layer provided | 1.5 |

*PBN layer exfoliated
—not measured

It is noted that the thickness of the PBN layer is controlled by adjusting each amount of the boron chloride ($BCl_3$) and the ammonia gas ($NH_3$) chemically reacting in the carbon furnace.

It is appreciated that the nitride-based ceramic powder includes oxinite aluminum ($Al_2O_3$) and sialon.

It is further appreciated that the sintering additive may be selected alone or in combination from the group consisting of oxides of rare earth metals and oxides, fluorides, carbides, chlorides of alkali earth metals.

While the invention has been described with reference to the specific embodiments, it is understood that this description is not to be construed in a limiting sense in as much as various modifications and additions to the specific embodiments may be made by skilled artisan without departing from the spirit and scope of the invention.

What is claimed is:

1. A spark plug insulator comprising a sintered body including aluminum nitride ceramic powder in an amount in the range 60%-98% by weight of the sintered body and a sintering additive, said sintering additive being selected from yttrium oxide ($Y_2O_3$), calcium oxide (CaO), barium oxide (BaO), calcium carbide ($CaC_2$), noedymium oxide ($Nd_2O_3$) and scandium oxide ($Sc_2O_3$); and a layer of pyrolytic boron nitride uniformly deposited on the entire surface of the sintered body, the thickness of the pyrolytic boron nitride layer ranging from 10 μm to 100 μm, said pyrolytic boron nitride being deposited on said sintered body by placing said sintered body in a carbon furnace in which boron chloride ($BCl_3$) and ammonia gas ($NH_3$) chemically react at a reaction temperature of 1900° C. under $10^{-2}$~$10^{-3}$ Torr so as to form a pyrolytic boron nitride, the pyrolytic boron nitride depositing on the entire surface of said sintered body to provide a pyrolytic boron nitride layer deposited at a rate of 20~30 μm per hour.

2. A method of providing a sintered spark plug insulator comprising the steps of:

preparing a mixture comprising aluminum nitride ceramic powder in an amount in the range from 60% to 98% of said mixture and a sintering additive;

pressing the mixture in a metallic die at a pressure of 1 ton/cm$^2$ so as to form a compact body;

primary-sintering the compact body at a primary-sintering temperature ranging from 500° C. to 600° C. for 5 hours, at a rate of the temperature rise of 300° C. per hour to said primary sintering temperature;

secondary-sintering the resulting compact body at a secondary-sintering temperature of 1650°~1950° C. in a nitrogen atmosphere for about 2 hours to form a sintered body; and lacing said sintered body in a carbon furnace in which boron chloride ($BCl_3$) and ammonia gas ($NH_3$) chemically react at a reaction temperature of 19800° C. under $10^{-2}$~$10^{-3}$ Torr so as to form a pyrolytic boron nitride, the pyrolytic boron nitride depositing on the entire surface of said sintered body to provide a pyrolytic boron nitride layer deposited at a rate of 20~30 μm per hour and for a thickness in the range 10–100 μm.

3. A method as recited in claim 2 wherein the sintering additive is selected from the group consisting of yttrium oxide ($Y_2O_3$), calcium oxide (CaO), barium oxide (BaO), calcium carbide ($CaC_2$), neodymium oxide ($Nd_2O_3$) and scandium oxide ($Sc_2O_3$).

* * * * *